(12) United States Patent
Geertsema et al.

(10) Patent No.: US 11,970,957 B2
(45) Date of Patent: Apr. 30, 2024

(54) ACOUSTIC TURBOFAN AIRFOIL APPARATUS

(71) Applicant: GENERAL ELECTRIC COMPANY, Schenectady, NY (US)

(72) Inventors: Egbert Geertsema, Evendale, OH (US); Nicholas J. Kray, Evendale, OH (US); Brandon W. Miller, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/406,930

(22) Filed: Aug. 19, 2021

(65) Prior Publication Data

US 2023/0059995 A1   Feb. 23, 2023

(51) Int. Cl.
| | |
|---|---|
| *F01D 9/02* | (2006.01) |
| *F01D 9/04* | (2006.01) |
| *F01D 25/04* | (2006.01) |
| *F02C 7/045* | (2006.01) |

(52) U.S. Cl.
CPC .............. F01D 9/02 (2013.01); F01D 25/04 (2013.01); *F05D 2220/323* (2013.01); *F05D 2230/13* (2013.01); *F05D 2230/30* (2013.01); *F05D 2240/12* (2013.01)

(58) Field of Classification Search
CPC ...... F02C 7/045; F02C 7/04; F05D 2250/283; F05D 2260/96; F05D 2260/963; F05D 2250/191; F05D 2220/32; F05D 2240/80; F05D 2250/182; F05D 2220/323; F05D 2230/13; F05D 2230/30; F05D 2240/12; F01D 9/041; F01D 9/02; F01D 25/04; F01D 25/24; F01D 25/246; F01D 5/145; G10K 11/172; G10K 11/002; F04D 29/542; F04D 29/681; F04D 29/664; F04D 29/563; F04D 29/667; F04D 29/665; B64D 2033/0206; B64D 33/02; B64D 33/06; F02K 1/827; F02K 3/06; Y10T 428/24149; Y10T 428/24165; Y10T 428/24174

See application file for complete search history.

(56) References Cited

U.S. PATENT DOCUMENTS

| | | | | |
|---|---|---|---|---|
| 3,819,008 | A | * | 6/1974 | Evans ............... F02C 7/045 428/116 |
| 4,379,191 | A | | 4/1983 | Beggs et al. |
| 6,764,276 | B2 | * | 7/2004 | Mulcaire .............. F01D 5/00 415/196 |
| 7,198,472 | B2 | | 4/2007 | McMillan et al. |
| 7,963,362 | B2 | * | 6/2011 | Lidoine ............... F02C 7/24 181/292 |
| 8,312,729 | B2 | | 11/2012 | Matwey et al. |
| 9,640,164 | B2 | | 5/2017 | Gerken et al. |

(Continued)

*Primary Examiner* — Eric J Zamora Alvarez
(74) *Attorney, Agent, or Firm* — HANLEY, FLIGHT & ZIMMERMAN, LLC

(57) ABSTRACT

Acoustic turbofan airfoil apparatus are disclosed. An example apparatus includes a platform of a turbofan engine, the platform including perforations to receive acoustic waves, acoustic chambers protruding from a first side of the platform, the acoustic chambers aligned with the perforations in a radial direction defined by the turbofan engine, the acoustic chambers to attenuate the acoustic waves, and an airfoil protruding from a second side of the platform opposite the first side of the platform.

19 Claims, 6 Drawing Sheets

(56) References Cited

U.S. PATENT DOCUMENTS

| | | | |
|---|---|---|---|
| 10,711,797 B2 * | 7/2020 | Kroger | F04D 29/684 |
| 10,723,476 B2 * | 7/2020 | Zaccardi | B64D 33/06 |
| 10,927,543 B2 | 2/2021 | Butler et al. | |
| 2010/0206664 A1 * | 8/2010 | Bagnall | G10K 11/172 |
| | | | 181/214 |
| 2018/0230836 A1 | 8/2018 | Tibbott et al. | |
| 2020/0049068 A1 * | 2/2020 | Lin | F01D 25/04 |
| 2020/0248570 A1 | 8/2020 | Lyders et al. | |
| 2020/0309028 A1 * | 10/2020 | Murugappan | F02K 1/827 |
| 2022/0084493 A1 * | 3/2022 | Bifulco | F01D 25/24 |

\* cited by examiner

ACOUSTIC TURBOFAN AIRFOIL APPARATUS

FIELD OF THE DISCLOSURE

This disclosure relates generally to turbofans, and, more particularly, to acoustic turbofan airfoil platforms and associated apparatus.

BACKGROUND

In general, aircraft engines are the main source of the noise produced by the aircraft, especially during takeoff and climb. The aircraft engines typically produce a loud mechanical noise as a result of mechanically rotating components therein and aerodynamic airflow therethrough. For instance, airfoils of the aircraft engines produce narrow band high intensity peaks that correspond to the rotational speed thereof.

Figure 1:
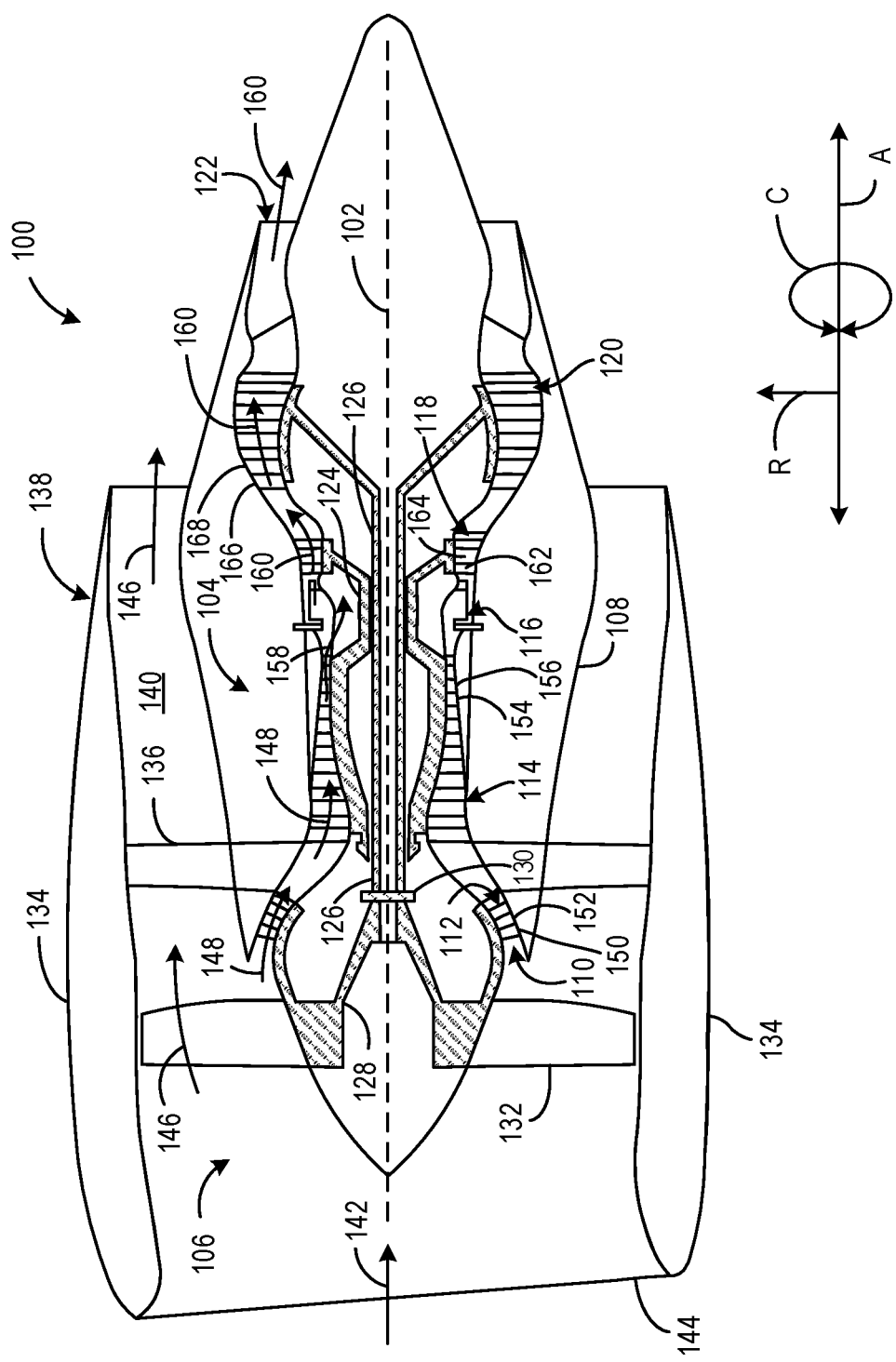
FIG. 1 illustrates a schematic cross-sectional view of a prior art example of a turbofan engine.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows.

DETAILED DESCRIPTION

The Federal Aviation Administration (FAA) regulates the maximum noise level that an individual civil aircraft can emit through standards defined in the U.S. Code of Federal Regulations (CFR) Title 14 Part 36. However, the noise that a turbofan engine produces is proportional to an operating speed thereof. As such, the speed of the aircraft may be limited by the level of noise that the aircraft produces.

To meet regulatory requirements, aircraft often include noise attenuating structures in associated turbofan engines. In some implementations, the turbofan engines include a honeycomb core attached to an inner wall of an inlet duct to attenuate acoustic waves impacting a surface of the turbofan engine. Further, a surface of the flow path of the turbofan engine may include perforations to receive the acoustic waves. In some implementations, the honeycomb core and/or the surface having the perforations are positioned between mounting surfaces of stationary guide vanes (e.g., inlet guide vanes, outlet guide vanes) of the turbofan engines.

However, incorporating the surface having the perforations and/or the honeycomb core between and/or around the mounting surfaces of the stationary guide vanes involves additional structures and, thus, adds weight to the aircraft. Additionally, fitting the surface having the perforations and/or the honeycomb core between the mounting surfaces of the vanes reduces an area of the flow path and limits a proximity within which the noise attenuating structures can be positioned relative to the vanes. In turn, such noise attenuating structures increase fuel consumption utilized to propel the aircraft while reducing a maximum speed thereof. Additionally, such noise attenuating structures are limited in a percentage of surface area of the flow path that contributes to noise attenuation.

Examples disclosed herein provide an acoustic turbofan airfoil apparatus to attenuate acoustic waves in turbofan engines. In certain examples, a turbofan engine (e.g., an aircraft engine) includes a platform positioned along a boundary of a flow path. In certain examples, the platform of the turbofan engine includes openings (e.g., holes, orifices, perforations, etc.) to receive acoustic waves. In certain examples, acoustic chambers are coupled to and/or protrude from a first side of the platform of the turbofan engine that faces opposite the flow path. In certain examples, an airfoil protrudes from a second side of the platform that defines a surface of the flow path. That is, the airfoil is integral with the platform.

In some examples, the platform defines an inner surface of the flow path of the turbine engine as a first radial end of the airfoil extends therefrom. Additionally or alternatively, the platform can define an outer surface of the flow path of the turbofan engine as a second radial end of the airfoil opposite the first radial end extends therefrom. In some examples, the platform defines a surface of a nacelle of the turbofan engine (e.g., an inner radial surface of the nacelle). In some examples, the platform defines a surface of an outer casing of the turbofan engine (e.g., an inner radial surface of the outer casing, an outer radial surface of the outer casing). In some examples, the platform defines a surface of a shaft of the turbofan engine (e.g., a rotary surface, a non-rotary surface). Accordingly, the airfoil can be implemented as an inlet guide vane, an outlet guide vane, a fan blade, a rotor blade, a stator vane, and/or any other airfoil in the turbofan engine. In some examples, the platform is rotatable relative to a surface of the turbofan engine to which the platform is coupled and, thus, enables the airfoil to serve as a variable pitch airfoil.

In some examples, the acoustic chambers are aligned with one or more of the openings in the platform. In some examples, the openings in the platform receive and, in turn, scatter or disperse the acoustic waves into the acoustic chambers. Further, existing air within the acoustic chambers provides a cushion that enables the acoustic chambers to dampen the acoustic waves. Accordingly, the acoustic chambers can receive and attenuate the acoustic waves encountered by the inner and/or outer radial surface of the flow path of the turbine engine.

In some examples, a size, a shape, an orientation, and/or a distribution of the openings is based on a position of ones of the openings relative to the airfoil and/or a location within the associated flow path. Similarly, a size and/or a shape of the acoustic chambers can be based on a position of the acoustic chambers relative to the airfoil and/or the openings. In some examples, the openings are unevenly distributed along the platform. For example, a greater portion of the openings can be positioned proximate a leading edge of the airfoil compared to the trailing edge of the airfoil. Additionally or alternatively, the distribution of the openings can be directly related to a proximity of the openings relative to the airfoil. In some examples, the openings include a first opening having a first size and/or shape and a second opening having a second size and/or shape different from the first size and/or shape. In some examples, the openings include a first opening having a first angular orientation relative to the platform and a second opening having a second angular orientation relative to the platform.

In some examples, the platform, the acoustic chambers, and the airfoil are produced via additive manufacturing. In some examples, the airfoil is integrally formed with the platform, and the acoustic chambers are coupled to the platform via an adhesive (e.g., an epoxy adhesive) and/or brazing. In some examples, the platform is coupled to a surface of the turbofan engine through dovetail and/or via mechanical fasteners (e.g., nuts, bolts, screws, etc.). In some examples, the acoustic chambers can be formed from Nomex® honeycomb, aluminum honeycomb, an additive metal alloy, and/or an additive polymer. In some examples, the platform and the airfoil can be composed of a metal, a polymer, and/or a ceramic material.

Referring now to the drawings, FIG. 1 is a schematic cross-sectional view of a prior art example of a turbofan engine 100 that may incorporate various examples disclosed herein. As shown in FIG. 1, the turbofan engine 100 defines a longitudinal or axial centerline axis 102 extending therethrough for reference. In general, the turbofan engine 100 can include a core turbine or a core turbine engine 104 disposed downstream from a fan section 106.

The core turbine engine 104 can generally include a substantially tubular outer casing 108 that defines an annular inlet 110. The outer casing 108 can be formed from multiple segments. The outer casing 108 encloses, in serial flow relationship, a compressor section having a booster or low-pressure compressor 112 ("LP compressor 112") and a high-pressure compressor 114 ("HP compressor 114"), a combustion section 116, a turbine section having a high-pressure turbine 118 ("HP turbine 118") and a low-pressure turbine 120 ("LP turbine 120"), and an exhaust section 122. A high-pressure shaft or spool 124 ("HP shaft 124") drivingly couples the HP turbine 118 and the HP compressor 114. A low-pressure shaft or spool 126 ("LP shaft 126") drivingly couples the LP turbine 120 and the LP compressor 112. The LP shaft 126 can also couple to a fan shaft or spool 128 of the fan section 106. In some examples, the LP shaft 126 can couple directly to the fan shaft 128 (i.e., a direct-drive configuration). In alternative configurations, the LP shaft 126 may couple to the fan shaft 128 via a reduction gearbox 130 (i.e., an indirect-drive or geared-drive configuration).

As shown in FIG. 1, the fan section 106 includes a plurality of fan blades 132 ("fan" 132) coupled to and extending radially outwardly from the fan shaft 128. An annular fan casing or nacelle 134 circumferentially encloses the fan section 106 and/or at least a portion of the core turbine engine 104. The nacelle 134 can be supported relative to the core turbine engine 104 by a forward mount 136. Furthermore, a downstream section 138 of the nacelle 134 can enclose an outer portion of the core turbine engine 104 to define a bypass airflow passage 140 therebetween.

As illustrated in FIG. 1, air 142 enters an intake or inlet portion 144 of the turbofan engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 (e.g., turbine blades) coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 where one or more sequential stages of HP turbine stator vanes 162 and HP turbine rotor blades 164 coupled to the HP shaft 124 extract a first portion of kinetic and/or thermal energy therefrom. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan engine 100, the core turbine 104 serves a similar purpose and sees a similar environment in land-based turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) can be included between any shafts and spools. For example, the reduction gearbox 130 can be disposed between the LP shaft 126 and the fan shaft 128 of the fan section 106.

As depicted therein, the turbofan engine 100 defines an axial direction A, a radial direction R, and a circumferential direction C. In general, the axial direction A extends generally parallel to the axial centerline axis 102, the radial direction R extends orthogonally outward from the axial centerline axis 102, and the circumferential direction C extends concentrically around the axial centerline axis 102.

Figure 2:
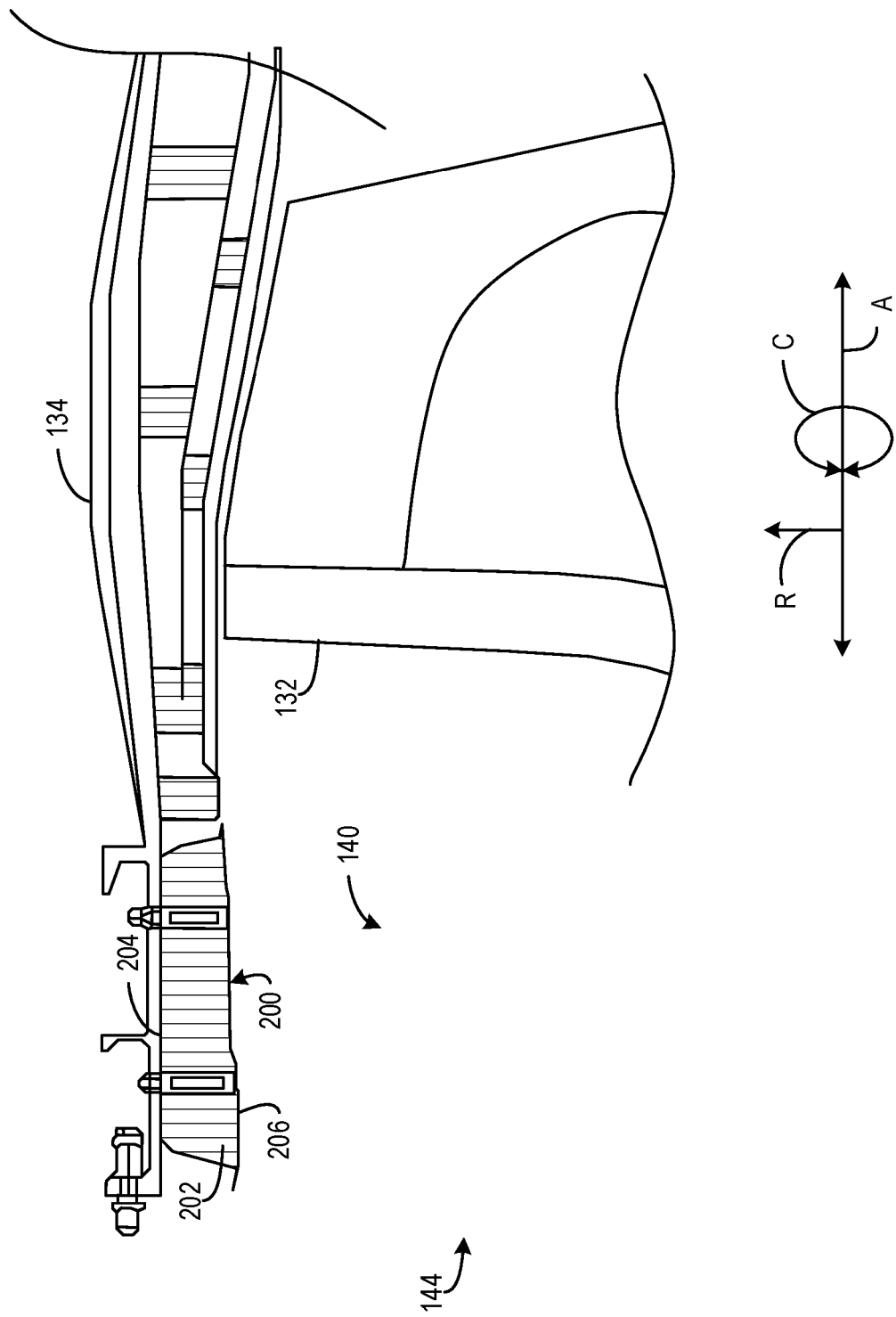
FIG. 2 illustrates a prior art example of an acoustic panel of a turbofan engine.

FIG. 2 illustrates a magnified view of the fan section 106 of the turbofan engine 100 of FIG. 1. In the illustrated example of FIG. 2, the fan section 106 includes an example prior art acoustic panel 200. The prior art acoustic panel 200 is coupled to the nacelle 134. The prior art acoustic panel 200 includes a honeycomb structure 202 positioned between a backing plate 204 and a perforated sheet 206 that faces the axial centerline 102. The perforated sheet 206 includes perforations that are uniformly distributed and oriented perpendicular to the axial centerline 102. As such, the prior art acoustic panel 200 attenuates some acoustic waves that are encountered through the inlet 144 of the bypass airflow passage 140 and/or produced by the fan blades 132. However, because the prior art acoustic panel 200 is spaced apart from airfoils, such as the fan blades 132, which produce and/or disperse the acoustic waves, the prior art acoustic panel 200 fails to absorb some of the acoustic waves produced by the fan blades 132. As such, some of the acoustic waves deflect off a surface, such as a surface from which the fan blades 132 extend (e.g., an outer radial surface of the fan shaft 128 of FIG. 1), that does not provide acoustic attenuation, which further disperses and/or amplifies the acoustic waves increasing the overall noise produced by the turbofan engine 100.

Figure 3:
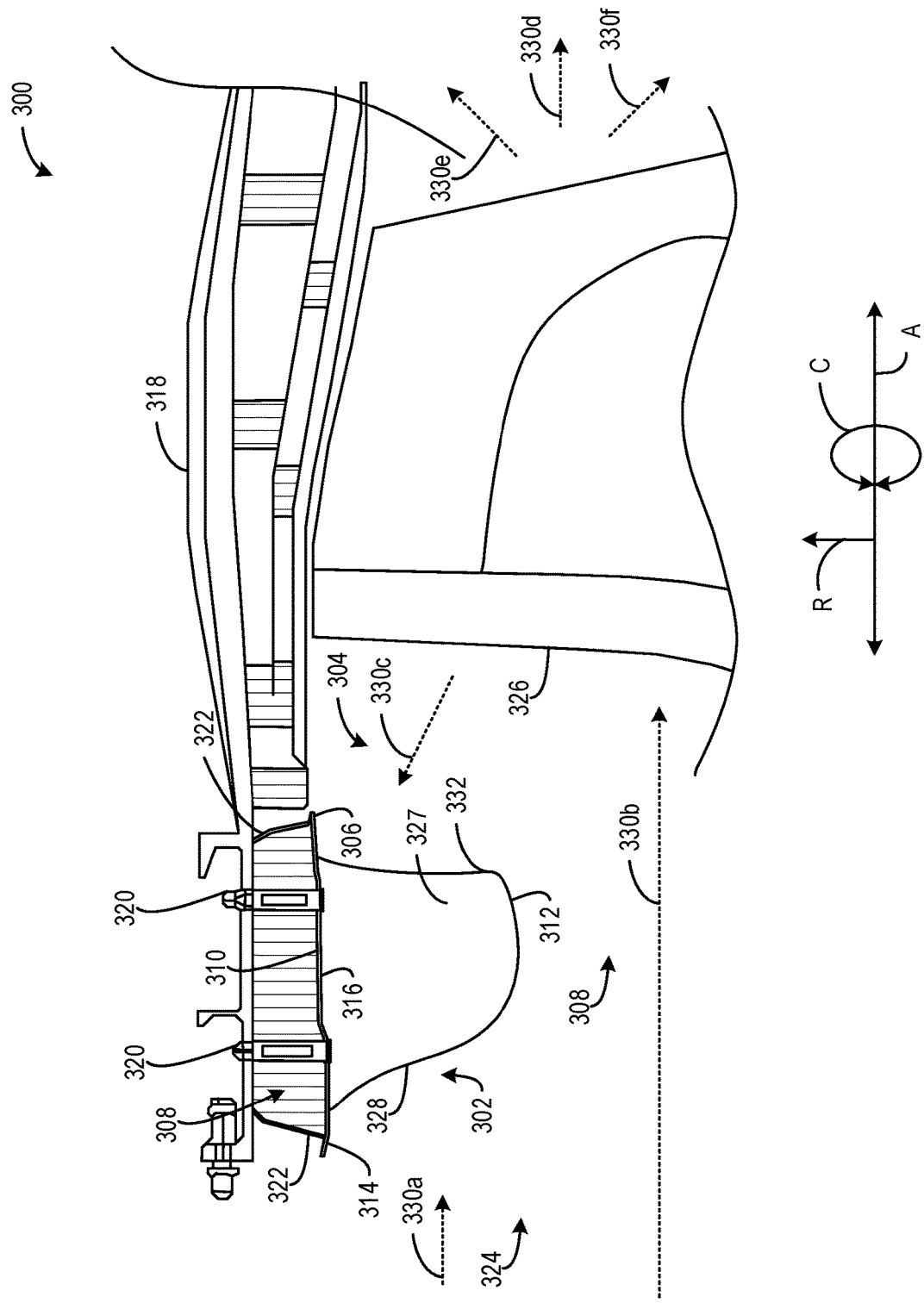
FIG. 3 illustrates an example turbofan engine having an example acoustic turbofan airfoil apparatus in accordance with the teachings disclosed herein.

FIG. 3 illustrates a cross-sectional view an example turbofan engine 300 including an example acoustic apparatus 302 in accordance with the teachings disclosed herein. Specifically, the cross-sectional view of the illustrated example is representative of an example fan section 304 of the turbofan engine 300 (e.g., the fan section 106 of FIGS. 1 and 2).

In FIG. 3, the acoustic apparatus 302 includes an example platform (e.g., a face sheet, a plate, etc.) 306, acoustic chambers 308 coupled to and/or extending from a first side (e.g., an outer radial surface) 310 of the platform 306, and an airfoil 312 protruding from a second side (e.g., an inner radial surface) 314 of the platform 306. Specifically, an outer radial end 316 of the airfoil 312 protrudes from (e.g., is integral with and formed as part of) the second side 314 of the platform 306.

In the illustrated example of FIG. 3, the platform 306 is coupled to a nacelle 318 of the turbofan engine 300 via mechanical fasteners 320. In some examples, sidewalls 322 of the acoustic apparatus 302 extending from the platform 306 are coupled to the nacelle 318 through dovetail. In the illustrated example, the acoustic apparatus 302 is positioned between an inlet 324 (e.g., the inlet 144 of FIGS. 1 and 2) and a fan 326 (e.g., the fan 132 of FIGS. 1 and 2) of the turbofan engine 300 in the axial direction A. As such, the airfoil 312 of the illustrated example of FIG. 3 is an inlet guide vane 312. Accordingly, the inlet guide vane 312 extends away from the nacelle 318 in the radial direction R toward an axial centerline axis of the turbofan engine 300 (e.g., the axial centerline axis 102 of FIG. 1). Specifically, the inlet guide vane 312 is a part span inlet guide vane 312, as described in U.S. Pat. No. 10,711,797 B2, which is hereby incorporated as a reference in its entirety.

In the illustrated example of FIG. 3, the platform 306 includes holes (e.g., orifices, perforations, openings, etc.) to receive acoustic waves encountered through, and/or produced by the inlet 324, the inlet guide vane 312, and/or the fan 326. In some examples, the holes are formed via drilling or laser drilling, which enables a certain shape (e.g., circular, oval, etc.), orientation (e.g., perpendicular, or non-perpendicular relative to the platform 306), distribution, or size to be defined for respective ones of the holes. For example, the shape, orientation, and/or size of the holes can be based on a position of the respective hole in the turbofan engine 300, a position or spatial relationship of the respective hole relative to other holes in the platform, a position or spatial relationship of the respective hole relative to the airfoil 312, and/or a position or spatial relationship of the respective hole relative to other airfoils, such as blades of the fan 326. As such, the shape, orientation, distribution, and/or size of the holes can be configured based on aerodynamic properties associated with a location of the respective holes in the turbofan engine 300, which enables the holes to receive an increased portion of the acoustic waves within the turbofan engine 300 compared to perforations in the perforated sheet 206 of the prior art acoustic panel 200.

In some examples, the airfoil 312 encounters and/or produces acoustic waves while producing aerodynamic forces, which affects a propagation of the acoustic waves within the turbofan engine 300. As such, the shape, orientation, distribution, and/or size of the holes in the platform 306 can be based on aerodynamic properties associated with the airfoil 312 and/or other airfoils in the turbofan engine 300 (e.g., the blades of the fan 326) to enable maximized or otherwise increased reception of the acoustic waves. For example, the holes in the platform 306 disposed proximate to the leading edge 328 of the airfoil 312 can be oriented to at least partially face the inlet 324 of the turbofan engine 300, which enables an increased area of the holes to be disposed along a travel path 330a, 330b, 330c, 330d, 330e, 330f of the acoustic waves produced and/or encountered by the airfoil 312, the inlet 324, and/or the fan 326.

Moreover, because the holes are formed in the platform 306 from which the inlet guide vane 312 protrudes, a position of the respective holes in the platform has an increased flexibility compared to the perforations in the perforated sheet 206 of the prior art acoustic panel 200. For example, the holes in the platform 306 that are proximate to side faces 327 of the airfoil 312 can be formed in an oblong shape with a longer portion thereof spanning in the axial direction A to receive an increased portion of the acoustic waves propagating along sides of the side faces 327 of the airfoil 312. Additionally, a portion of the holes in the platform 306 can be positioned proximate to a leading edge 328, a trailing edge 332 of the inlet guide vane 312, and/or anywhere else in the platform 306 to receive acoustic waves produced by the inlet guide vane 312, which would otherwise avoid an acoustic panel separate and/or spaced apart from the airfoil 312, such as the prior art acoustic panel 200.

In some examples, the holes in the platform 306 have a tighter distribution in certain areas of the turbofan engine 300 and a looser distribution in other areas of the turbofan engine 300. For example, when the acoustic apparatus 302 is implemented in an area of the turbofan engine 300 associated with highly variable and/or unpredictable acoustic wave propagation, the holes positioned in the area can include the tighter distribution along with various shapes, sizes, and/or orientations to account for different acoustic wave propagations. Further, when the acoustic apparatus 302 is implemented in an area of the turbofan engine 300 associated with substantially consistent acoustic wave propagations, the holes positioned in the area can include a uniform shape, size, and/or orientation based on the acoustic waves encountered thereby to receive a maximized or otherwise increased portion of the acoustic waves. In some examples, the holes in the platform 306 have an increased separation between each other in areas of the turbofan engine 300 associated with the substantially consistent acoustic wave propagation and/or in other areas that encounter acoustic waves at a reduced frequency. Accordingly, the holes can be unevenly distributed along the platform 306 to maximize or otherwise increase a percentage of the acoustic waves that pass through the holes while also providing structural support.

In the illustrated example of FIG. 3, one or more of the holes in the platform 306 are aligned with respective ones of the acoustic chambers 308 in the radial direction R. For example, perimeters of two or more of the holes in the platform 306 can be aligned within a perimeter of one of the acoustic chambers 308 in the radial direction R. Accordingly, the acoustic chambers 308 can absorb and/or attenuate the acoustic waves that pass through the holes in the platform 306. Specifically, air within the acoustic chambers 308 has a damping effect on the acoustic waves, which enables the acoustic chambers 308 to provide acoustic attenuation. In some examples, the size and/or the shape of the acoustic chambers 308 and/or the holes in the platform 306 is based on a volume of the air to be positioned within the respective acoustic chamber 308 to attenuate the acoustic waves.

In some examples, the size and/or the shape of the respective acoustic chambers 308 is based on an amplitude of the acoustic waves and/or the path 330a, 330b, 330c, 330d, 330e, 330f according to which the acoustic waves travel while passing through the holes in the platform 306 to maximize or otherwise increase attenuation of the acoustic waves. Accordingly, the size and/or the shape of the acoustic chambers 308 can be based on the size, shape, distribution, and/or orientation of the holes in the platform 306 aligned with the respective acoustic chambers 308 in the radial direction R. As a result, the acoustic chambers 308 can optimize or otherwise improve an attenuation of the acoustic waves compared to the uniform distribution of the honeycomb structure 202 of the prior art acoustic panel 200.

In some examples, a first acoustic chamber 308 includes a first size and/or a first shape and a second acoustic chamber 308 includes a second size different from the first size and/or a second shape different from the first shape. Accordingly, some of the acoustic chambers 308 can be configured for increased acoustic attenuation and others of the acoustic chambers can be configured to provide increased structural support in addition to acoustic attenuation. In some examples, the size and/or the shape of the acoustic chambers 308 is based on a position of the respective acoustic chamber 308 in the turbofan engine 300, a position or spatial relationship of the respective acoustic chamber 308 relative to the airfoil 312, and/or a position or spatial relationship of the respective acoustic chamber 308 relative to other airfoils, such as the blades of the fan 326. Because the airfoil 312 is integral with the platform 306, the acoustic chambers 308 can be positioned closer to the airfoil 312 than the honeycomb structure 202 of the prior art acoustic panel 200. As such, the acoustic chambers 308 can provide acoustic attenuation in areas of the turbofan engine 300 closer to a source of the acoustic waves than the honeycomb structure 202 of the prior art acoustic panel 200, which prevents or otherwise reduces a deflection and/or propagation of the acoustic waves.

In the illustrated example of FIG. 3, the platform 306 and the airfoil 312 (e.g., the inlet guide vane 312) can be formed from a metallic material, a polymer material, or a ceramic material. In FIG. 3, the acoustic chambers 308 can be formed from Nomex® honeycomb, aluminum honeycomb, cells of an additive metal alloy, and/or cells of an additive polymer. In FIG. 3, the platform 306, the acoustic chambers 308, and the airfoil 312 are integrally formed via additive manufacturing. In some examples, the platform 306 and the airfoil 312 are formed via additive manufacturing and the acoustic chambers 308 are coupled to the first side 310 of the platform 306 via an adhesive.

Figure 4A:
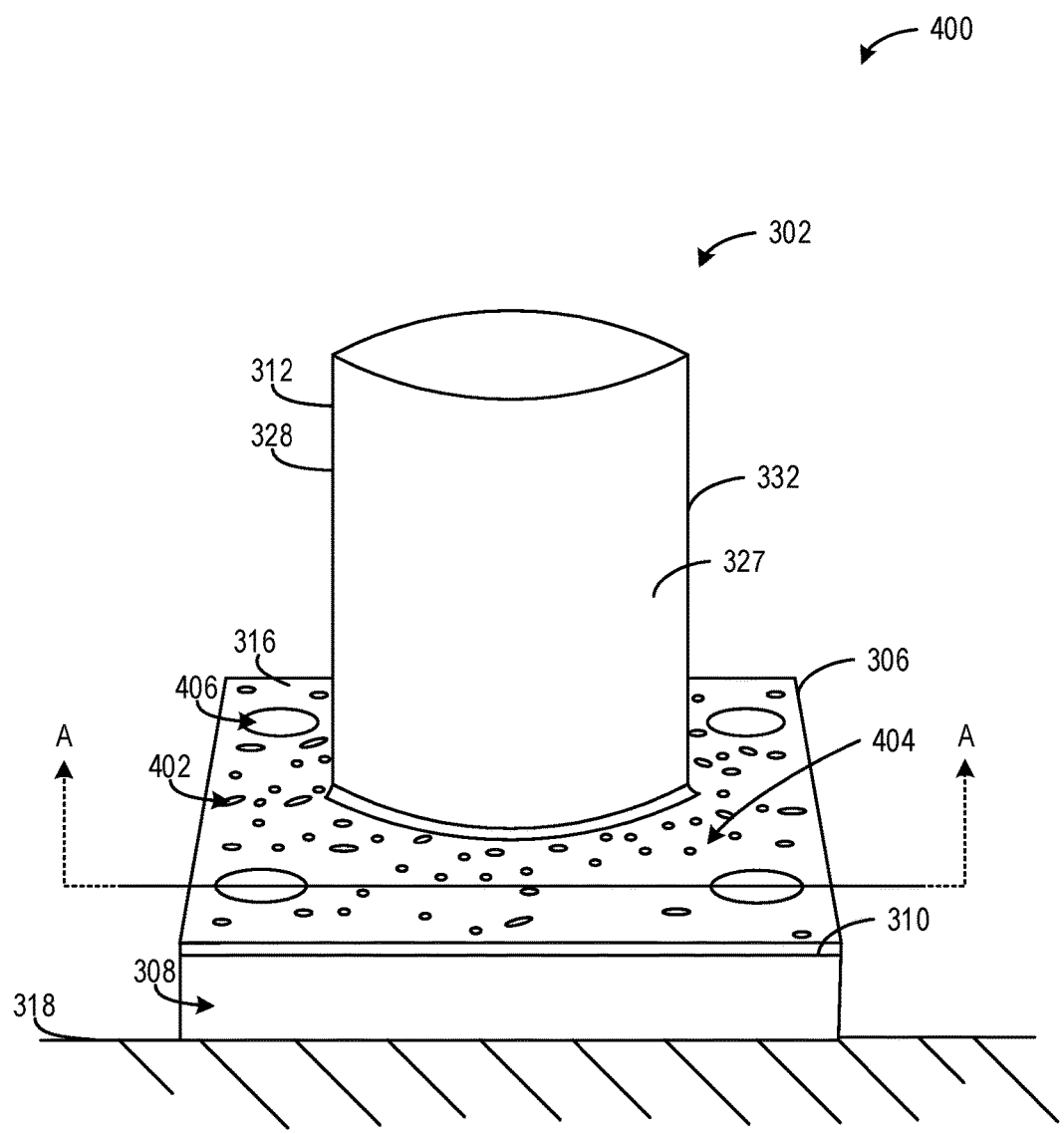
FIG. 4A illustrates an isolated perspective view of the example acoustic turbofan airfoil apparatus of FIG. 3.
Figure 4B:
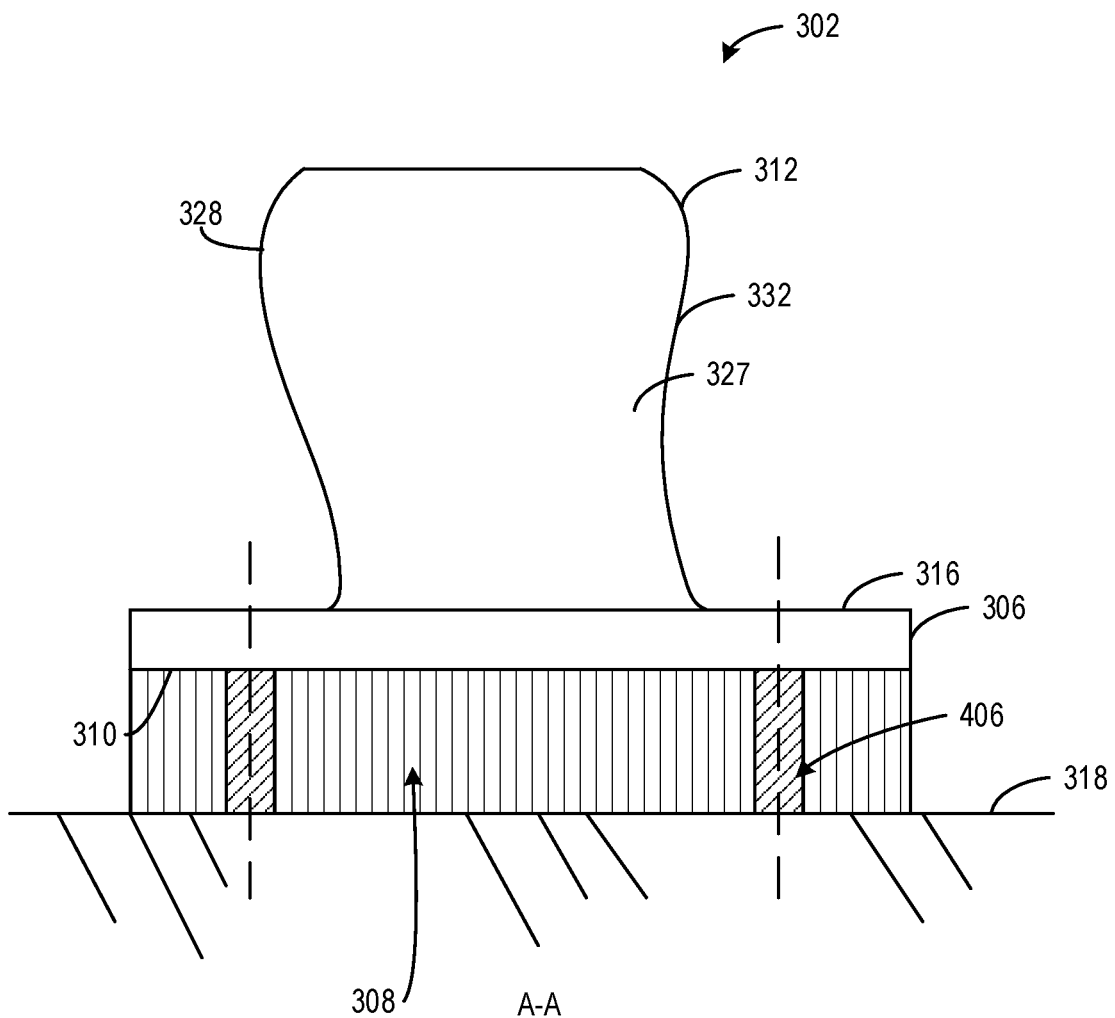
FIG. 4B illustrates a cross-sectional view of the example acoustic turbofan airfoil apparatus of FIG. 4A.

FIG. 4A illustrates an isolated perspective view 400 of the example acoustic apparatus 302 of FIG. 3. FIG. 4B illustrates a cross-section A-A of the example acoustic apparatus 302 of FIG. 4A.

In the illustrated example of FIG. 4A, the platform 306 includes example holes (e.g., perforations, pores, orifices, etc.) 402 defined therein. The holes 402 extend through the first side 310 and the second side 314 of the platform 306 to define a flow path through which acoustic waves can travel into the acoustic chambers 308. In FIG. 4A, at least two of the holes 402 align with each of the acoustic chambers 308. In FIG. 4A, the holes 402 include various sizes, shapes, angular orientations, and density distributions. In some examples, the sizes, shapes, angular orientations, and density distributions of the holes 402 are based on an airflow pressure associated with a location where the acoustic apparatus 302 is implemented in the turbofan engine 300. For example, the holes 402 can include a higher density distribution and/or a larger size in response to a corresponding location in the turbofan engine 300 being associated with higher pressure airflow. In the illustrated example, the holes 402 are positioned in the platform 306 around an area from which the airfoil 312 protrudes. In the illustrated example, the holes 402 include an uneven distribution 404. Accordingly, the holes 402 can receive the acoustic waves produced and/or deflected by the airfoil 312. Because the acoustic waves are received by the platform 306 from which the airfoil 312 protrudes, the acoustic apparatus 302 minimizes or otherwise reduces a weight of the turbofan engine 300 that would otherwise be increased by acoustic panels separate from the airfoil 312 (e.g., the prior art acoustic panel 200).

In the illustrated example of FIG. 4A, the size, the shape, the angular orientation, and/or the uneven distribution 404 of the respective holes 402 can be based on acoustic waves encountered by the platform 306 and the path 330a, 330b, 330c, 330d, 330e, 330f according to which the acoustic waves travel. In some examples, one or more of the holes 402 minimize or otherwise reduce a surface area of the platform 306 off of which the acoustic waves can deflect and contact the airfoil 312. In some examples, one or more of the holes 402 maximize or otherwise increase a reception of the acoustic waves that are produced and/or encountered by the airfoil 312. For example, one or more of the holes 402 can include an angular orientation that at least partially faces in a same direction as the leading edge 328 of the airfoil 312 to receive the acoustic waves produced by the airfoil 312 and/or forward of the airfoil 312 in the axial direction A. Further, one or more of the holes 402 can include an angular orientation that at least partially faces in a same direction as the trailing edge 332 of the airfoil 312 to receive acoustic waves produced by other airfoils disposed aft of the airfoil 312 in the axial direction A, such as the fan blades 326. Moreover, one or more of the holes 402 can at least partially face in a direction toward the side faces 327 of the airfoil 312 to receive acoustic waves that are produced by and/or deflect off of the side face 327. Additionally or alternatively, one or more of the holes 402 can at least partially face in a direction away from the side face 327 to receive acoustic waves produced by other airfoils, which also minimizes or otherwise reduces acoustic waves deflected by the airfoil 312. In some examples, one or more of the holes 402 are positioned perpendicularly in the platform 306. Moreover, the size, the shape, and/or the uneven distribution 404 of the respective holes 402 can be based on the orientation of the holes 402 and/or possible paths of the acoustic waves to be received by the holes 402.

In some examples, the size and/or the shape of the respective holes 402 are based on a volume of air to be positioned within the acoustic chambers 308 associated therewith. For example, to provide maximum or otherwise increased acoustic attenuation, the size of the respective holes 402 can be large enough to receive as much of the acoustic waves as possible while also being small enough to maintain at least a portion of the volume of the air within the acoustic chambers 308 along with a structural integrity of the platform 306. In some examples, the size and/or the shape of the acoustic chambers 308 and/or the holes 402 aligned therewith are based on parameters that determine the volume of air to be positioned within the acoustic chambers 308, such as an amplitude or a range of amplitudes and/or a frequency or range of frequencies of the acoustic waves that typically enter the acoustic chambers 308. Accordingly, the size, the shape, the orientation, and/or the uneven distribution 404 of the holes 402 and the size and/or the shape of the acoustic chambers 308 can be determined based on a location of the respective holes 402 and acoustic chambers 308 within the turbofan engine 300. As a result, the size, the shape, the angular orientation, and/or the uneven distribution 404 of the holes 402 and the size and/or the shape of the acoustic chambers 308 can maximize or otherwise increase an attenuation of acoustic waves encountered by the platform 306 to minimize or otherwise reduce acoustic waves via a flow path defined by the acoustic chambers 308 and, thus, minimize or otherwise reduce an overall sound profile of the turbofan engine 300.

In the illustrated example of FIGS. 4A-B, the acoustic apparatus 302 includes slots 406 through which the mechanical fasteners 320 are inserted to couple the acoustic apparatus 302 to the nacelle 318. In some examples, the holes 402 and/or the acoustic chambers 308 are positioned based on a location of the slots 406 and/or a size and/or shape of the mechanical fasteners 320 to be inserted therethrough. Moreover, because the acoustic apparatus 302 includes the airfoil 312 as opposed to being a separate panel, such as the prior art acoustic panel 200, the acoustic apparatus 302 can reduce a quantity of the mechanical fasteners 320 utilized by the turbofan engine 300 and, in turn, reduce a weight of the turbofan engine 300 compared to the prior art turbofan engine 100. Further, because the acoustic apparatus 302 enables the turbofan engine 300 to utilize fewer of the mechanical fasteners 320, the acoustic apparatus 302 can include fewer of the slots 406 than the prior art turbofan engine. As such, the acoustic chambers 308 and the holes 402 can span across an increased area of the turbofan engine 300 compared to the honeycomb structure 202 and the perforations in the perforated sheet 206 of the prior art acoustic panel 200. Accordingly, the acoustic apparatus 302 maximizes or otherwise increases a surface area of the turbofan engine 300 associated with acoustic attenuation while also minimizing or otherwise reducing a weight of the turbofan engine 300.

Figure 5:
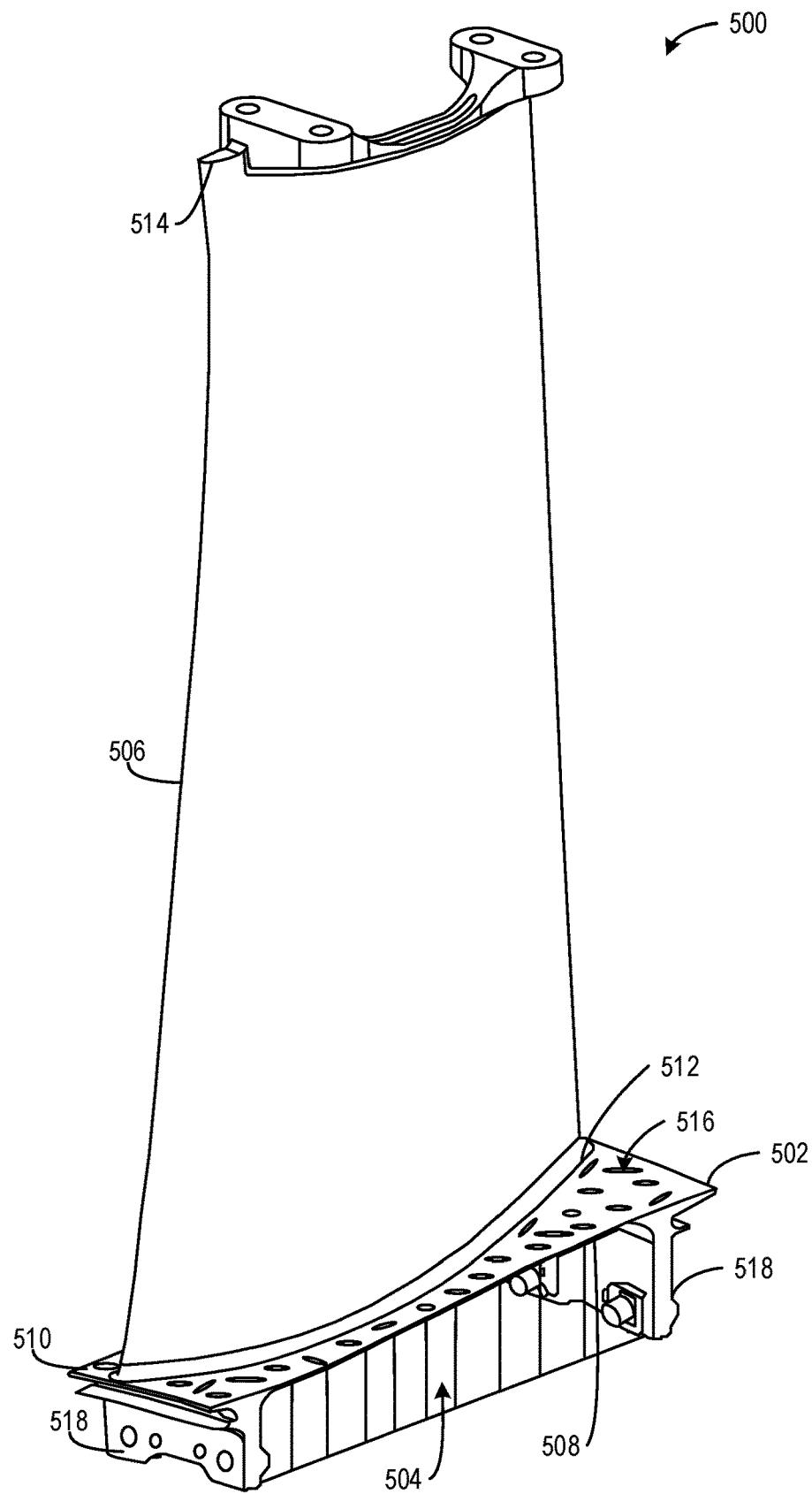
FIG. 5 illustrates an isolated perspective view of another example acoustic turbofan airfoil apparatus in accordance with the teachings disclosed herein.

FIG. 5 illustrates an isolated perspective view of another example acoustic apparatus 500 in accordance with the teachings of this disclosure. In the illustrated example of FIG. 5, the acoustic apparatus 500 includes a platform 502 (e.g., the platform 306 of FIGS. 3 and 4A-B), acoustic chambers 504 (e.g., the acoustic chambers 308 of FIGS. 3 and 4A-B), and an airfoil 506. Similar to the acoustic apparatus 302 of FIGS. 3 and 4A-B, the acoustic chambers 504 are coupled to and/or protrude from a first side 508 of the platform 502 and the airfoil 506 protrudes from a second side of the platform 510. In the illustrated example, a first end 512 of the airfoil 506 protrudes from the platform 502.

In some examples, the acoustic apparatus 500 includes a second platform (e.g., the platform 502, the platform 306) from which a second end 514 of the airfoil 506 protrudes. Accordingly, a second set of acoustic chambers (e.g., the acoustic chambers 504, the acoustic chambers 308) can be coupled to and/or extend from the second platform opposite the second end 514 of the airfoil 506.

In FIG. 5, the platform 502 includes perforations 516 (e.g., the holes 402) that align with the acoustic chambers 504. In the illustrated example, the perforations 516 are positioned in the platform 502 around the first end 512 of the airfoil 506. In FIG. 5, shapes, sizes, and/or angular orientations of the perforations 516 are configurable. In the illustrated example, the perforations 516 include various shapes, sizes, and/or angular orientations. In some other examples, the perforations 516 in the platform 502 include approximately identical or similar configurations, which may be configured based on an area of implementation of the acoustic apparatus 500. In FIG. 5, the acoustic chambers 504 include various sizes and/or shapes. In some other examples, the acoustic chambers 504 include approximately identical sizes and/or shapes, which may be configured based on the area of implementation of the acoustic apparatus 500. In the illustrated example, the perforations 516 receive acoustic waves encountered by the platform 502. In turn, air contained by the acoustic chambers 504 attenuates the acoustic waves to minimize or otherwise reduce a sound profile of an associated turbofan engine (e.g., the turbofan engine 100 of FIGS. 1 and 2, the turbofan engine 300 of FIG. 3, etc.).

In the illustrated example of FIG. 5, the acoustic apparatus 500 includes sidewalls 518 extending from the first side 508 of the platform 502. Accordingly, the acoustic chambers 504 are positioned between the respective sidewalls 518. In some examples, the sidewalls 518 are coupled to the associated turbofan engine through dovetail and/or via mechanical fasteners (e.g., the mechanical fasteners 320) to mount the acoustic apparatus 500.

In the illustrated example of FIG. 5, the airfoil 506 is a full span airfoil 506 as opposed to the partial span airfoil 312 of FIGS. 3 and 4A-B. That is, the sidewalls 518 are coupled to a turbofan engine (e.g., the turbofan engine 100 of FIG. 1, the turbofan engine 300 of FIG. 3) along an inner diameter of a flow path (e.g., the bypass airflow passage 140 of FIGS. 1 and 2), and the second end 514 of the airfoil 506 is coupled to the turbofan engine along an outer diameter of the flow path opposite the first side. In some examples, the second end 514 of the airfoil 506 extends to the outer diameter of the flow path without being coupled thereto. In some examples, the sidewalls 518 are coupled to the outer diameter of the flow path. As such, the platform 502 and the acoustic chambers 504 can be positioned along the inner diameter and/or the outer diameter of the flow path of the turbofan engine. Further, the acoustic apparatus 500 can be separated from the turbofan engine in response to the sidewalls 518 being uncoupled from the turbofan engine. As such, the acoustic apparatus 500 can be removed to improve accessibility to other parts of the turbofan engine for repairs. Additionally or alternatively, the acoustic apparatus 500 can be implemented and utilized in more than one turbofan engine.

In the illustrated example of FIG. 5, the airfoil 506 can be implemented in various locations throughout the turbofan engine as a static airfoil, a rotating airfoil, and/or a variable pitched airfoil. For example, the airfoil 506 can be implemented as a fan blade (e.g., the fan blade 132 of FIGS. 1 and 2, the fan blade 326 of FIGS. 3 and 4A-B), a stator vane (e.g., the LP compressor stator vanes 150, the HP compressor stator vanes 154, the HP turbine stator vanes 162, and/or the LP turbine stator vanes 166 of FIG. 1), a rotor blade (e.g., the LP compressor rotor blades 152, the HP compressor rotor blades 156, the HP turbine rotor blades 164, and/or the LP turbine rotor blades 168), an inlet guide vane (e.g., a full span inlet guide vane), and/or an outlet guide vane. In some examples, the sidewalls 518 can be coupled to a nacelle (e.g., the nacelle 134 of FIGS. 1 and 2, the nacelle 318 of FIGS. 3 and 4A-B), an outer casing (e.g., the outer casing 108 of FIG. 1), a high-pressure shaft (e.g., the HP shaft 124 of FIG. 1), a low-pressure shaft (e.g., the LP shaft 126 of FIG. 1), and/or a fan shaft (e.g., the fan shaft 128 of FIG. 1). In some examples, the platform 306 defines a surface of the nacelle, the outer casing, the high-pressure shaft, the low-pressure shaft, and/or the fan shaft enabling acoustic attenuation to be provided across such surfaces. Further, when the airfoil 506 is implemented as a variable pitched airfoil, the sidewalls 518 of the platform 502 are coupled to a surface of a bushing, a rotatable column, or a shaft via rotatable trunnions that rotate to adjust a pitch of the airfoil 506. Accordingly, the associated bushing, column, or shaft is coupled to the nacelle, the outer casing, the high-pressure shaft, the low pressure shaft, and/or the fan shaft. As such, the platform 502 is coupled to a rotatable surface to enable an adjustment to a pitch of the airfoil.

Although examples disclosed herein describe the acoustic apparatus 302, 500 as having the individual airfoil 312, 506, the acoustic apparatus 302, 500 can include a plurality of the airfoil 312, 506 extending from the platforms 306, 502 to provide a sector of the associated turbofan engine (e.g., the turbofan engine 300). That is, the platform 306, 502 can form a ring from which the plurality of the airfoil 312, 506 protrude. Further, the acoustic chambers 308, 504 can form a ring coupled to and/or extending from the platform 306, 502 opposite the plurality of the airfoil 312, 506. In turn, the sidewalls 322, 518 can form rings that are coupled to a nacelle, an outer casing, a high-pressure shaft, a low-pressure shaft, and/or a fan shaft. As such, the acoustic apparatus 302, 500 can form a fan and/or an assembly or ring of inlet guide vanes, outlet guide vanes, stator vanes, and/or rotor blades. Further, the acoustic apparatus (e.g., a first acoustic apparatus) 302, 500 that defines a stator vane or a ring of stator vanes, for example, can extend to another one of the acoustic apparatus (e.g., a second acoustic apparatus) 302, 500 that defines a rotor blade or a ring of rotor blades. As a result, the acoustic apparatus 302, 500 enables a majority of the surfaces of the nacelle, outer casing, high-pressure shaft, low-pressure shaft, and/or fan shaft to be associated with acoustic attenuation. Thus, the acoustic apparatus 302, 500 can optimize or otherwise improves a sound profile of the associated turbofan.

Although each example acoustic apparatus disclosed above has certain features, it should be understood that it is not necessary for a particular feature of one example acoustic apparatus to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

In some examples, the acoustic apparatus 302, 500 includes means for receiving acoustic waves defined in a surface of an aircraft engine, such as the turbofan engine 300. For example, the means for receiving may be implemented by holes 402 and/or the perforations 516. In some examples, the acoustic apparatus 302, 500 includes means for attenuating the acoustic waves extending from a first side of the means for receiving. In such examples, the means for attenuating is aligned with the means for receiving in a radial direction defined by the aircraft engine. For example, the means for attenuating may be implemented by the acoustic chambers 308 and/or the acoustic chamber 504. In some examples, the acoustic apparatus 302, 500 includes means for producing an aerodynamic force protruding from a second side of the means for receiving opposite the first side. For example, the means for producing an aerodynamic force may be implemented by the airfoil 312, 506.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example acoustic turbofan airfoil apparatus have been disclosed that provide acoustic attenuation within a turbofan engine without requiring panels separate from an airfoil. Thus, the example acoustic apparatus disclosed herein can render such panels that are specifically incorporated for acoustic attenuation unnecessary. As such, the example acoustic apparatus disclosed herein reduce a weight of the turbofan engine that would otherwise be encountered from the panels specifically incorporated for acoustic attenuation. Additionally, the example acoustic apparatus disclosed herein maximizes or otherwise increases an area of a flow path(s) within the associated turbofan engine, which can improve an efficiency associated therewith.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Further aspects of the present disclosure are provided by the subject matter of the following clauses:

1. An apparatus comprising: a platform of a turbofan engine, the platform including perforations to receive acoustic waves, acoustic chambers protruding from a first side of the platform, the acoustic chambers aligned with the perforations in a radial direction defined by the turbofan engine, the acoustic chambers to attenuate the acoustic waves, and an airfoil protruding from a second side of the platform opposite the first side of the platform.
2. The apparatus of any preceding clause, wherein the airfoil is an inlet guide vane.
3. The apparatus of any preceding clause, wherein the platform defines an inner diameter of a flow path of the turbofan engine.
4. The apparatus of any preceding clause, wherein the platform defines an outer diameter of a flow path of the turbofan engine.
5. The apparatus of any preceding clause, wherein the platform defines an inner surface of a nacelle of the turbofan engine.
6. The apparatus of any preceding clause, wherein the platform defines a surface of an outer casing of the turbofan engine.
7. The apparatus of any preceding clause, wherein the platform defines a surface of a shaft of the turbofan engine.
8. The apparatus of any preceding clause, wherein the platform is coupled to a rotatable surface to enable an adjustment to a pitch of the airfoil.
9. The apparatus of any preceding clause, wherein a distribution of the perforations is based on a location of ones of the perforations relative to the airfoil.
10. The apparatus of any preceding clause, wherein the perforations are unevenly distributed along the platform.
11. The apparatus of any preceding clause, wherein the perforations include at least a first perforation and a second perforation, the first perforation including a first size or shape, the second perforation including a second size or shape different from the first size or shape.
12. The apparatus of any preceding clause, wherein the perforations include at least a first perforation and a second perforation, the first perforation including a first angular orientation relative to the platform, the second perforation including a second angular orientation relative to the platform.
13. The apparatus of any preceding clause, wherein the platform, the acoustic chambers, and the airfoil are produced via additive manufacturing.
14. A turbofan engine comprising: a face sheet including holes, the face sheet defining a surface of the turbofan engine, acoustic chambers extending from a first side of the face sheet, and an airfoil integral with a second side of the face sheet opposite the first side.
15. The turbofan engine of any preceding clause, wherein the face sheet and the airfoil are formed via additive manufacturing.
16. The turbofan engine of any preceding clause, wherein the acoustic chambers are coupled to the first side of the face sheet via an adhesive.
17. The turbofan engine of any preceding clause, wherein the holes are formed in the face sheet via laser drilling.
18. An apparatus comprising: means for receiving acoustic waves in a surface of an aircraft engine, means for attenuating the acoustic waves extending from a first side of the means for receiving, the means for attenuating aligned with the means for receiving in a radial direction defined by the aircraft engine, and means for producing an aerodynamic force protruding from a second side of the means for receiving opposite the first side.
19. The apparatus of any preceding clause, wherein the means for receiving includes a first means for receiving and a second means for receiving, the first means for receiving including at least one of a first size or a first shape, the second means for receiving including at least one of a second size or a second shape, the second size different from the first size, the second shape different from the first shape.
20. The apparatus of any preceding clause, wherein the means for attenuating includes a first means for attenuating and a second means for attenuating, the first means for attenuating including at least one of a first size or a first shape, the second means for attenuating including at least one of a second size or a second shape, the second size different from the first size, the second shape different from the first shape.

What is claimed is:

1. An apparatus comprising:
   a platform of a turbofan engine, the platform including first perforations to receive acoustic waves and second perforations to receive mechanical fasteners that couple the platform to a nacelle of the turbofan engine;
   acoustic chambers integral with and protruding from a first side of the platform, the acoustic chambers aligned with the first perforations in a radial direction defined by the turbofan engine, the acoustic chambers to attenuate the acoustic waves; and
   an airfoil integral with and protruding from a second side of the platform opposite the first side of the platform.

2. The apparatus of claim 1, wherein the airfoil is an inlet guide vane.

3. The apparatus of claim 1, wherein the platform defines an outer diameter of a flow path of the turbofan engine.

4. The apparatus of claim 1, wherein the platform defines an inner surface of the nacelle of the turbofan engine.

5. The apparatus of claim 1, wherein the platform defines a surface of an outer casing of the turbofan engine.

6. The apparatus of claim 1, wherein the platform defines a surface of a rotatable shaft of the turbofan engine that enables an adjustment to a pitch of the airfoil, and wherein the surface defines an inner diameter of a flow path of the turbofan engine.

7. The apparatus of claim 1, wherein a distribution of the first perforations is based on a location of the first perforations relative to the airfoil.

8. The apparatus of claim 1, wherein the first perforations are positioned in a first distribution in a first area of the platform and a second distribution in a second area of the platform different from the first area, the perforations positioned closer together in the first distribution than in the second distribution.

9. The apparatus of claim 1, wherein the first perforations include a first size or shape, and wherein the second perforations include a second size or shape different from the first size or shape.

10. The apparatus of claim 1, wherein the first perforations include at least a first perforation and a second perforation, the first perforation including a first angular orientation relative to the platform, the second perforation including a second angular orientation relative to the platform.

11. The apparatus of claim 1, wherein the platform, the acoustic chambers, and the airfoil are produced via additive manufacturing.

12. The apparatus of claim 1, wherein the acoustic chambers are aligned with the mechanical fasteners in a circumferential direction defined by the turbofan engine.

13. A turbofan engine comprising:
    a face sheet including holes, the face sheet defining a surface of the turbofan engine, the holes including a first hole and a second hole, the first hole including a first leading edge and a first trailing edge, the first leading edge separated from an axial centerline of the turbofan engine by a different distance than the first trailing edge, the second hole including a second leading edge and a second trailing edge, the second leading edge separated from the axial centerline by a same distance as the second trailing edge;
    acoustic chambers integral with and extending from a first side of the face sheet; and
    an airfoil integral with a second side of the face sheet opposite the first side.

14. The turbofan engine of claim 13, wherein the face sheet and the airfoil are formed of a same material via additive manufacturing.

15. The turbofan engine of claim 13, wherein the holes are formed in the face sheet with more than one orientation via laser drilling.

16. The turbofan engine of claim 13, further including sidewalls protruding from the first side of the face sheet around the acoustic chambers, wherein the sidewalls are coupled to a nacelle of the turbofan engine via dovetail.

17. The turbofan engine of claim 13, wherein the acoustic chambers are aligned with the first hole and the second hole.

18. An apparatus comprising:
    means for receiving acoustic waves in a surface of an aircraft engine, the means for receiving including a first means for receiving and a second means for receiving, the first means for receiving including a circular cross-sectional area, the second means for receiving including an oblong cross-sectional area;
    means for attenuating the acoustic waves integral with and extending from a first side of the means for receiving, the means for attenuating aligned with the means for receiving in a radial direction defined by the aircraft engine; and
    means for producing an aerodynamic force integral with and protruding from a second side of the means for receiving the acoustic waves opposite the first side, the oblong cross-sectional area including a lengthwise portion spanning a same direction as side faces of the means for producing.

19. The apparatus of claim 18, wherein the means for attenuating includes a first means for attenuating and a second means for attenuating, the first means for attenuating including at least one of a first size or a first shape, the second means for attenuating including at least one of a second size or a second shape, the second size different from the first size, the second shape different from the first shape, the first means for attenuating positioned closer than the second means for attenuating to the means for producing the aerodynamic force, the first size or the first shape configured for increased structural support relative to the second size or the second shape, the second size or the second shape configured for increased acoustic attenuation relative to the first size or the first shape.

* * * * *